United States Patent
Koike (10) Patent No.: US 6,915,691 B2
(45) Date of Patent: Jul. 12, 2005

(54) LIQUID LEVEL SENSOR USING A NON LINEAR RHEOSTAT AND A FLOAT

(75) Inventor: Makoto Koike, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 20 days.

(21) Appl. No.: 10/451,790

(22) PCT Filed: Apr. 18, 2003

(86) PCT No.: PCT/JP03/04937
§ 371 (c)(1),
(2), (4) Date: Jul. 11, 2003

(87) PCT Pub. No.: WO2004/003489
PCT Pub. Date: Jan. 8, 2004

(65) Prior Publication Data
US 2004/0216522 A1 Nov. 4, 2004

(30) Foreign Application Priority Data
May 31, 2002 (JP) .................... 2002-158935

(51) Int. Cl.[7] .............................. G01F 23/00
(52) U.S. Cl. ....................... 73/313; 73/290 R
(58) Field of Search ................ 73/313, 290 R, 73/319, 309

(56) References Cited

U.S. PATENT DOCUMENTS

| 4,107,998 | A | * | 8/1978 | Taylor | 73/313 |
| 4,699,003 | A | * | 10/1987 | Harde | 73/313 |
| 4,724,705 | A | * | 2/1988 | Harris | 73/313 |
| 5,074,053 | A | * | 12/1991 | West | 33/708 |
| 5,138,881 | A | * | 8/1992 | Riley et al. | 73/304 R |
| 6,272,911 | B1 | * | 8/2001 | Hinkle | 73/118.1 |

* cited by examiner

Primary Examiner—Hezron Williams
Assistant Examiner—Rodney Frank
(74) Attorney, Agent, or Firm—Arent Fox PLLC

(57) ABSTRACT

In a fuel tank level sensor 1 for measuring a remaining amount of fuel in accordance with a resistance value which is varied by moving a rheostat 1a utilizing a float 1c that vertically moves according to increase and decrease of the fuel in a fuel tank 2, change in resistance value of the rheostat 1a includes a linear range in which the resistance value linearly varies with the increase and decrease of the fuel, and a non-linear range in which the resistance value discontinuously varies under full-tank conditions where the fuel tank is substantially filled up with the fuel. Even upon undesirable increase of the resistance value of the rheostat 1a as a result of deposition of sulfides, the sensor 1 can always detect accurately that the fuel tank 2 is filled up.

7 Claims, 11 Drawing Sheets

FIG.9 ical field

This invention relates to a fuel tank level sensor and an apparatus for determining a remaining amount of fuel, which are used for a fuel tank of an automobile or the like to determine the amount of fuel remaining in the fuel tank.

BACKGROUND ART

The automobile that runs on fuel such as gasoline is equipped with a fuel tank for storing fuel, and an apparatus for determining a remaining amount of fuel, which apparatus is provided so that a driver can be informed of the amount of fuel remaining in the fuel tank.

A conventional apparatus for determining a remaining amount of fuel includes a fuel tank level sensor provided in a fuel tank, and a fuel gauge that indicates the remaining amount of fuel to a driver. The fuel tank level sensor includes a float that floats on the surface of liquid fuel, a contact that moves vertically according as the float moves vertically, and a rheostat that changes an electric resistance value thereof according to a contact position thereof with the contact. Typically, the contact and the rheostat in operation are always put in a state of immersion in liquid fuel or exposure to evaporated fuel.

Conventionally, the fuel tank level sensor determines the amount of fuel remaining in the fuel tank by making use of changes in electric resistance value of the rheostat which take place according as the contact position between the contact and the rheostat changes with vertical movement of the float resting on the surface of liquid fuel.

Figure 9:
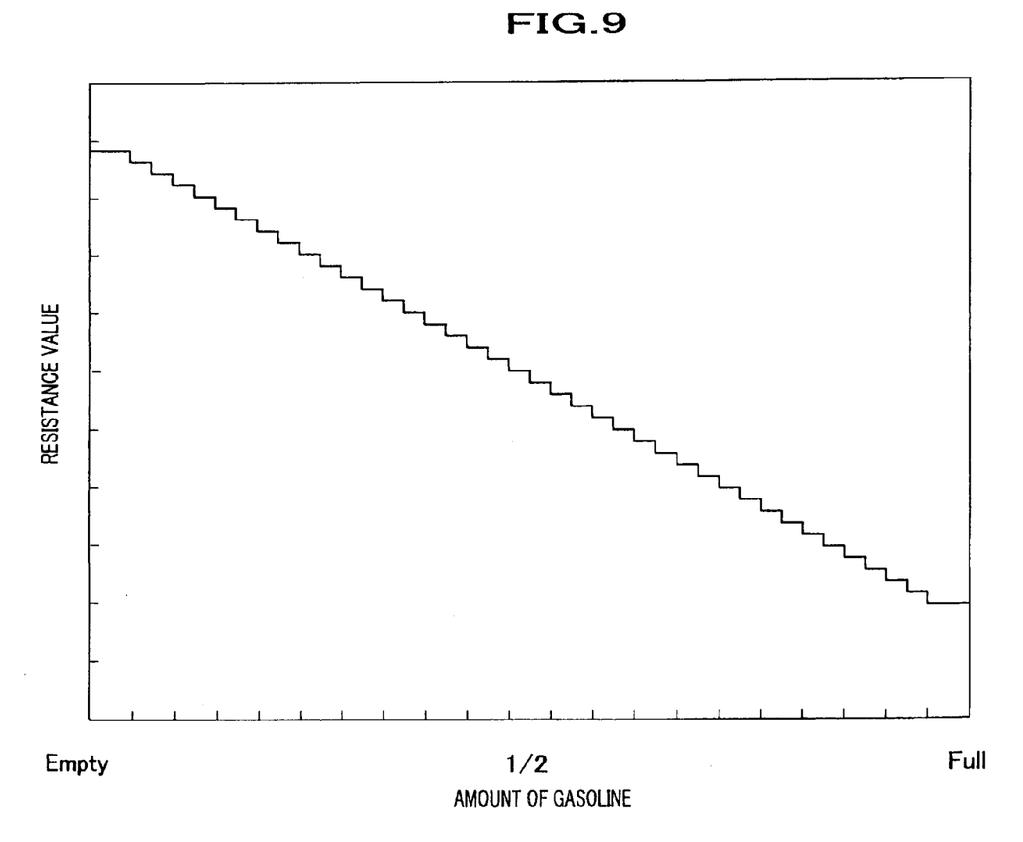
FIG. 9 is a graph showing a relationship between resistance values of a rheostat and amounts of fuel (gasoline) remaining in a fuel tank in a conventional apparatus.

There is shown in graph form in FIG. 9 a relationship between resistance values of the rheostat and amounts of fuel remaining in the fuel tank. In the graph, the rheostat is configured to let its resistance value decrease linearly according as the amount of fuel remaining in the fuel tank increases.

Incidentally, it is known that fuels such as gasoline contain sulfur which is deposited in sulfide form with time on the contact and rheostat, to raise the resistance value of the rheostat and widen variations in the resistance values.

Figure 10:
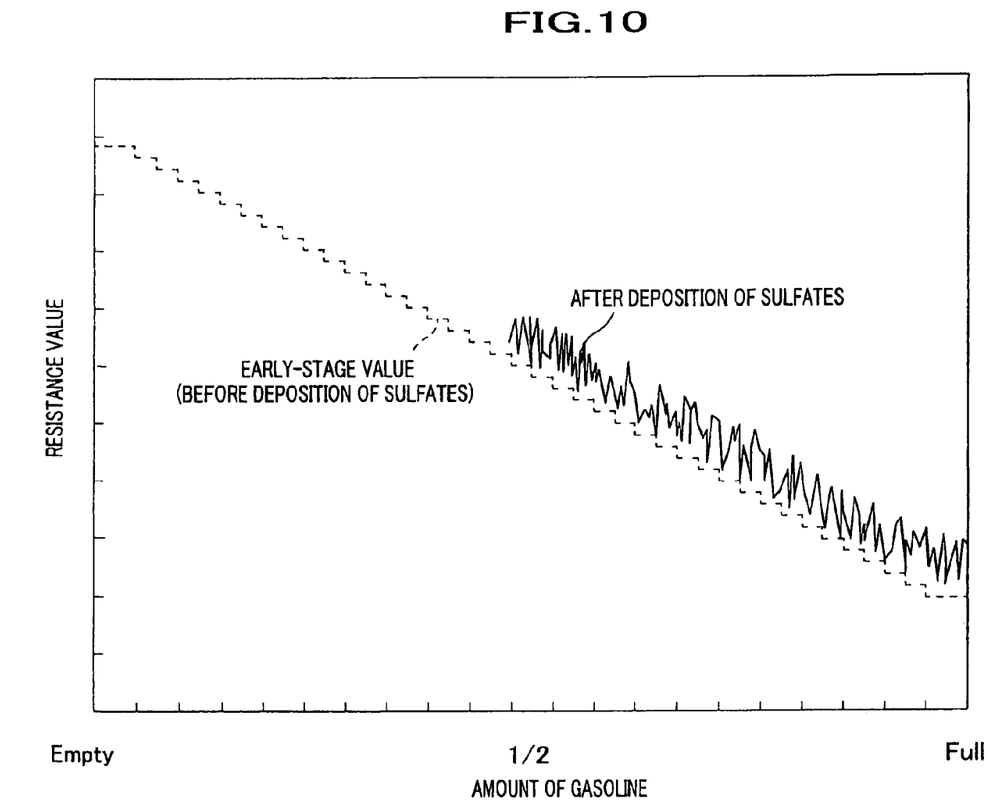
FIG. 10 is a graph showing a relationship (after deposition of sulfides) between resistance values of the rheostat and amounts of fuel (gasoline) remaining in the fuel tank in the conventional apparatus.

Consequently, when sulfides are deposited, as indicated by a solid line in FIG. 10, the resistance values of the rheostat are raised overall from early-stage values (a broken line in FIG. 10), and the variations become wide. To be more specific, as the example shown in FIG. 10 demonstrates, values given as an indication of the remaining amounts of fuel by the fuel gauge (readouts) become smaller than actual remaining amounts of the fuel (true values).

Figure 11:
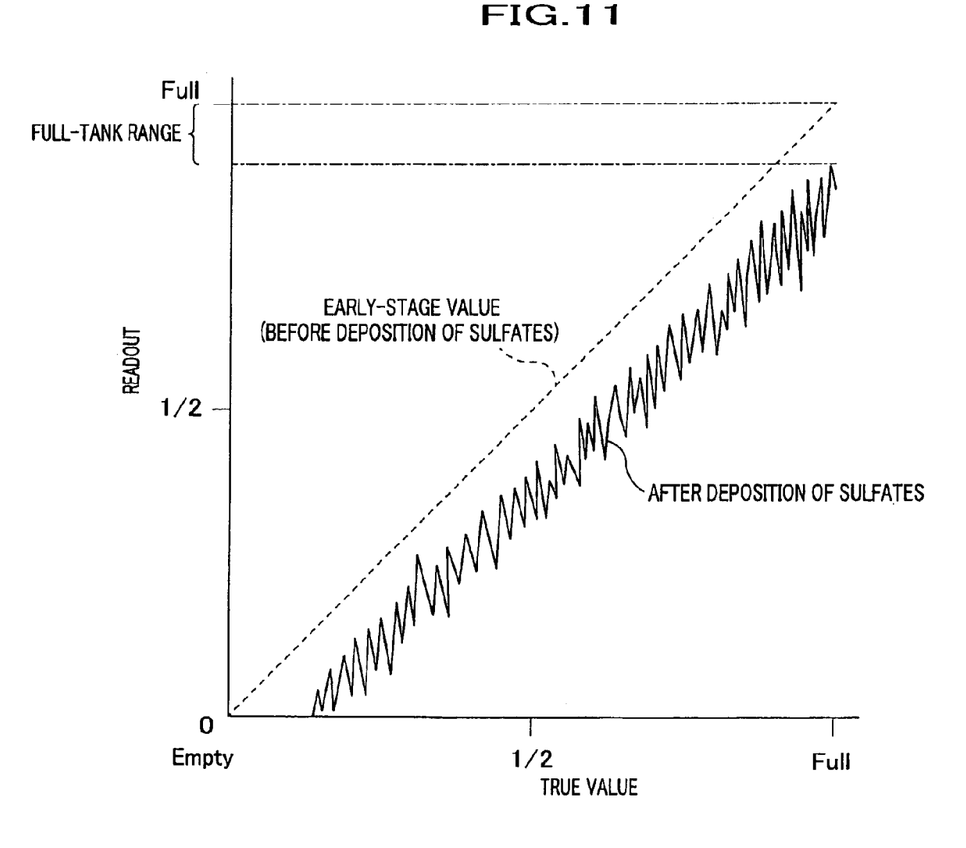
FIG. 11 is a graph showing a relationship (after deposition of sulfides) between readouts of a fuel gauge and true values of the remaining amounts of fuel in the conventional apparatus.

This phenomenon is illustrated by FIG. 11. In FIG. 11, the axis of ordinates represents the readouts of the fuel gauge, and the axis of abscissas represents the true values indicating the amounts of fuel actually remaining in the fuel tank. In the early-stage values (as indicated by broken line), good agreement is observed between the readouts and the true values. However, when sulfides are deposited and the resistance value is raised (as indicated by solid line), the agreement is broken and the readouts become smaller than the true values.

Even when the phenomenon as shown in FIG. 11 takes place, a full-tank indication range represented by dash-and-dot lines in FIG. 11 is a range of readouts of fuel levels which may be recognized as a fill-up by a person who visually sees the indication of the fuel gauge. It is shown in FIG. 11 that even if the true value becomes a value equivalent to a fill-up after the sulfides are deposited, the readout still does not reach the full-tank indication range.

Such an undesirable gap between the readouts and the true values, which results from deposition of sulfides as described above, would disadvantageously give a vague sense of injustice to a driver who has made a fill-up request at a gas station or the like. Because the fuel gauge provides a readout that appears as if the fuel tank had not been filled up notwithstanding the fuel tank has actually been filled up with fuel.

The present invention has been made with consideration given to the above-described disadvantages, and it is an exemplified object of the present invention to provide a fuel tank level sensor that can always detect a fill-up of a fuel tank adequately even if a resistance value of a rheostat increases with deposition of sulfides.

Another exemplified object of the present invention is to provide an apparatus for determining a remaining amount of fuel that can precisely determine the amount of fuel remaining in a fuel tank based upon fill-up information detected by the fuel tank level sensor without relying on the resistance value of the rheostat.

DISCLOSURE OF INVENTION

A fuel tank level sensor according to one exemplified aspect of the present invention is a fuel tank level sensor for measuring a remaining amount of fuel in accordance with a resistance value which is varied by moving a rheostat utilizing a float that vertically moves according to increase and decrease of the fuel in a fuel tank, in which change in resistance value of the rheostat is comprised of a linear range in which the resistance value linearly varies with the increase and decrease of the fuel, and a non-linear range in which the resistance value discontinuously varies under full-tank conditions where the fuel tank is substantially filled up with the fuel.

With the fuel tank level sensor having an arrangement as described above, the resistance values of the rheostat in a state exhibited at early stages (before deposition of sulfides) belong to either of two distinct ranges, depending on the amount of fuel, that is, on the level of the float. A description will be given of these ranges in association with fluctuation of the amount of fuel in the fuel tank. First, before the amount of fuel remaining in the fuel tank starting at zero gets into a full-tank condition, the resistance value of the rheostat varies linearly according to the vertical movement of the float (linear range).

Subsequently, when the fuel tank is filled up with fuel and the float goes up to the top, the resistance value of the rheostat discontinuously varies from the end of the linear range to assume a peculiar value (non-linear range).

Assume that the rheostat is configured to allow resistance values thereof to take on values either in the linear range where the resistance value of the rheostat linearly decreases or in the non-linear range where the resistance value of the rheostat discontinuously lowers by a predetermined value to be a peculiar value.

Regarding the rheostat having an arrangement as above, next discussion is directed to a relationship between the resistance values and the readouts of the fuel gauge under conditions where sulfides are deposited. The resistance values when the fuel tank is not in a full-tank condition (i.e., falling within the linear range) become higher than those at early stages (before deposition of sulfides) because sulfides are deposited, and the readouts of the fuel gauge thus takes on values smaller than the amount of fuel actually remaining (true values).

Under full-tank conditions (non-linear state), however, although the resistance value becomes higher than the early-stage values (before deposition of sulfides), but the adequately set predetermined value can make the resistance values lower than the value at the end of the linear range. In other words, with the rheostat having thus-configured arrangement as above, the readouts of the fuel gauge under the full-tank conditions can be made identical with the true values even if sulfides are deposited.

An apparatus for determining a remaining amount of fuel according to another exemplified aspect of the present invention is an apparatus that determines the amount of fuel remaining in a fuel tank in accordance with fuel consumption information of a fuel-injected engine, fill-up information detected by the above fuel tank level sensor, and a full-tank capacity of the fuel tank, whereas the apparatus works out the amount of fuel remaining in the fuel tank by subtracting from the full-tank capacity a fuel consumption indicated by the fuel consumption information, the fuel consumption having a value totalized after the fill-up information indicates that the fuel tank is filled up.

The apparatus for determining a remaining amount of fuel having an arrangement as above is an apparatus that estimates the amount of fuel remaining in the fuel tank by making use of good detection capabilities of the above fuel tank level sensor secured even if sulfides are deposited.

To be more specific, when the fuel tank gets into a full-tank condition, the fuel tank level sensor outputs fill-up information to the apparatus for a remaining amount of fuel; then, the apparatus for determining a remaining amount of fuel estimates the amount of fuel remaining in the fuel tank by an arithmetic operation in which the amount of fuel consumed by the engine is subtracted from the full-tank capacity that is the amount of fuel the fuel tank can hold.

As discussed above, the apparatus for determining a remaining amount of fuel according to the present invention does not utilize the resistance value of the rheostat in the fuel tank level sensor except the fill-up information, and can therefore estimate an accurate remaining amount of fuel without fail even if the resistance value measured in the fuel tank level sensor increases due to deposition of sulfides.

Other objects and further features of the present invention will become readily apparent from the following description of preferred embodiments with reference to accompanying drawings.

MODE(S) FOR CARRYING OUT THE INVENTION

Embodiments of the present invention will be described with reference made to the drawings where deemed appropriate.

Figure 1:
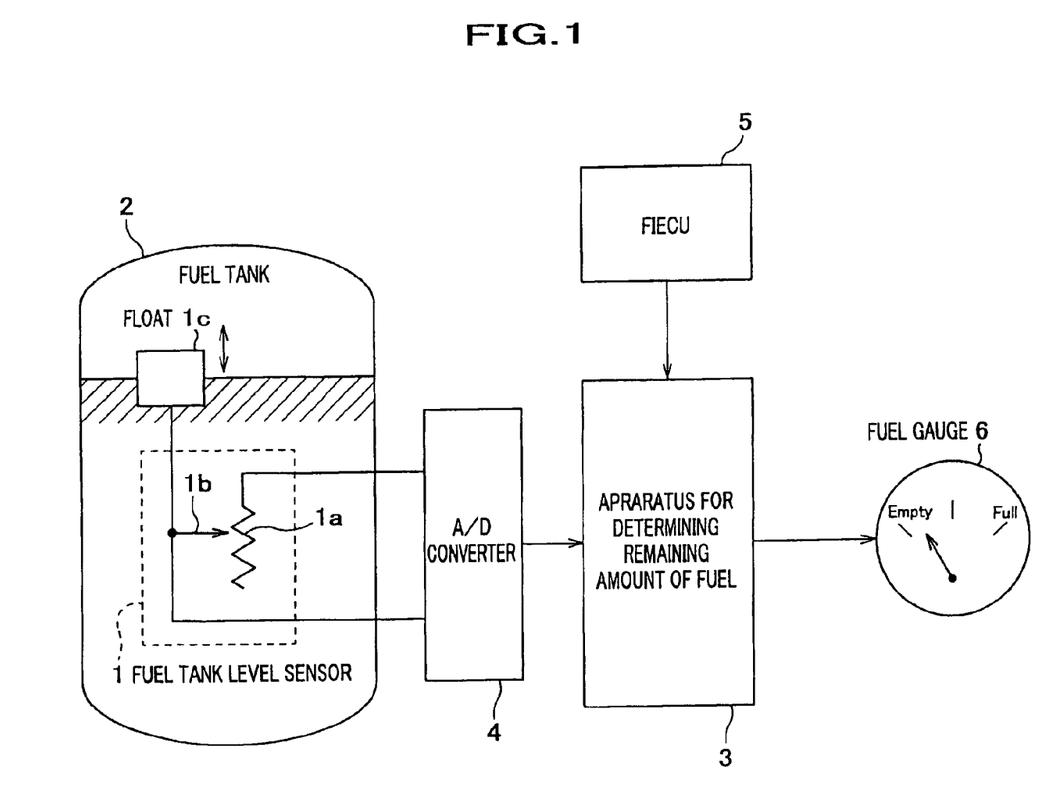
FIG. 1 is a functional block diagram of a fuel tank level sensor according to the present invention and a relation thereof with an apparatus for determining a remaining amount of fuel.

A fuel tank level sensor according to the present invention together with a relation thereof with an apparatus for determining a remaining amount of fuel is schematically illustrated in FIG. 1. Referring to FIG. 1, a fuel tank level sensor 1 includes a rheostat 1a and a contact 1b, and soaks in fuel. The contact 1b is connected with a float 1c floating on the surface of the liquid fuel. The contact 1b moves vertically according as the float 1c moves vertically, so that a portion thereof in contact with the rheostat 1a shifts to change the resistance value of the rheostat 1a.

An apparatus 3 for determining a remaining amount of fuel is connected with the fuel tank level sensor 1 through an A/D converter 4, and receives resistance values of the rheostat 1a obtained from the fuel tank level sensor 1. The apparatus 3 for determining a remaining amount of fuel is connected with an FIECU (Fuel Injection Electronic Control Unit) 5, and receives fuel consumption information of a fuel-injected engine from the FIECU 5.

In the apparatus 3 for determining a remaining amount of fuel, the amount of fuel remaining in the fuel tank 2 is estimated in a manner as will be described later, based upon information (resistance value, fuel consumption information, etc.) received as described above, and is outputted to a fuel gauge 6.

Next, a detailed description will be given of the fuel tank level sensor 1 according to the present invention.

Figure 2:
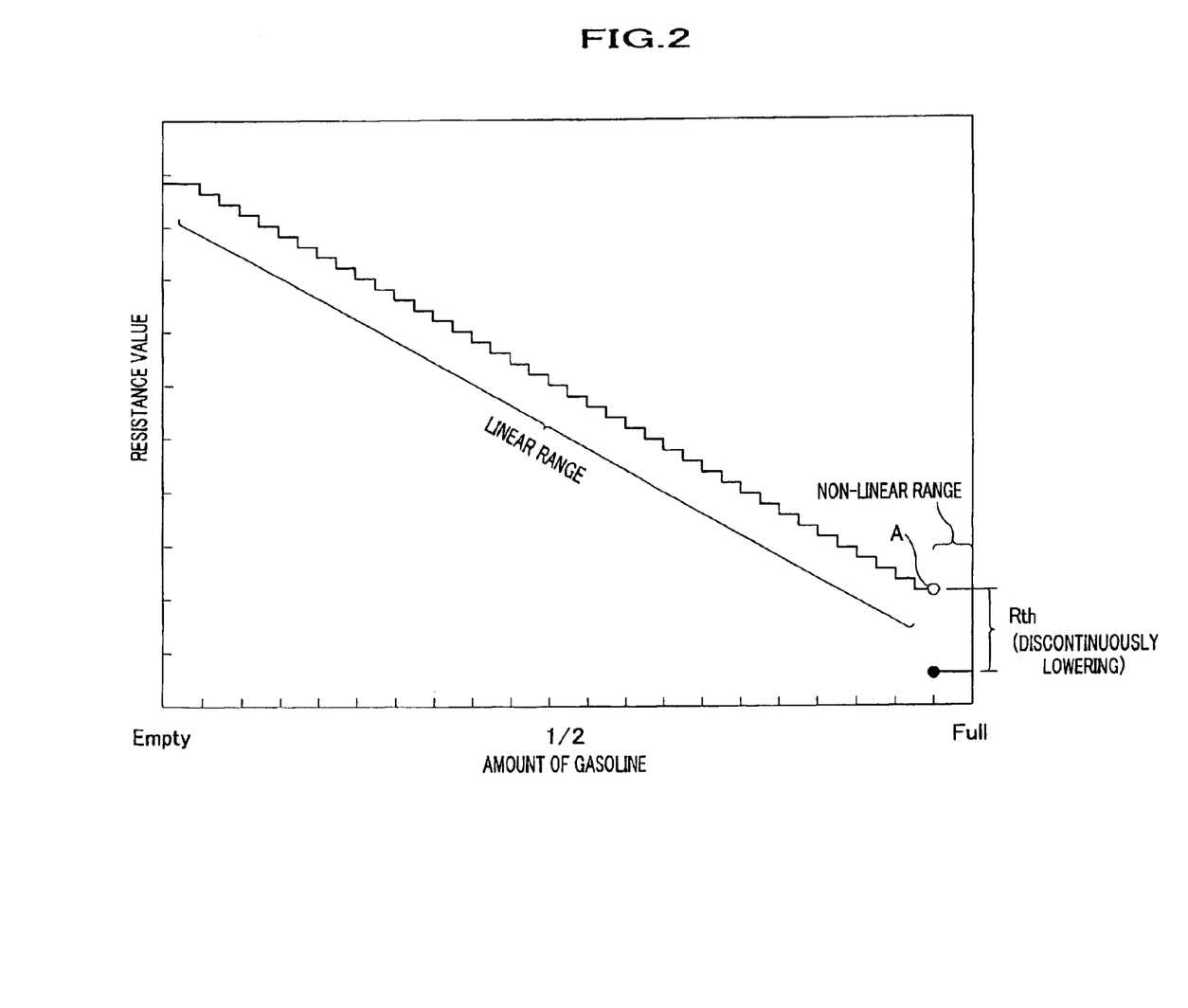
FIG. 2 is a graph showing a relationship (at an early stage) between resistance values of the fuel tank level sensor according to the present invention, and amounts of fuel (gasoline) remaining in a fuel tank.

A relationship between resistance values of the fuel tank level sensor 1 according to the present invention exhibited before deposition of sulfides (early-stage values) and amounts of fuel remaining in the fuel tank 2 is graphically shown in FIG. 2.

The resistance values of the rheostat 1a may be divided into a linear range in which the resistance value decreases linearly at a specific degree of inclination with increase of the fuel in the fuel tank 2, and a non-linear range in which the resistance value discontinuously lowers by a predetermined value Rth at an end A of the linear range where the fuel tank 2 is substantially filled up, and is subsequently kept at a peculiar value.

Figure 3:
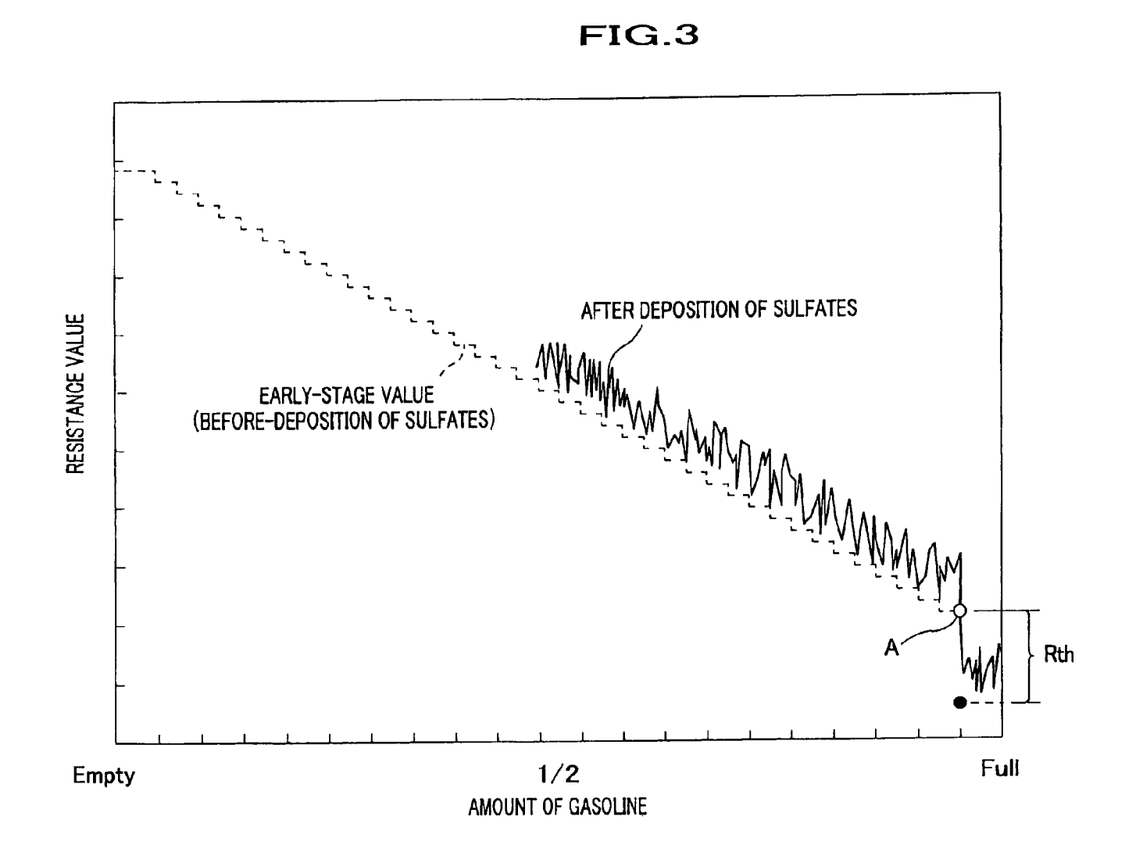
FIG. 3 is a graph showing a relationship between resistance values and amounts of fuel (gasoline) remaining in the fuel tank, after deposition of sulfides, in the fuel tank level sensor according to the present invention.

Next, a relationship between resistance values of the fuel tank level sensor 1 according to the present invention exhibited after deposition of sulfides and amounts of fuel remaining in the fuel tank 2 is graphically shown in FIG. 3. Due to deposition of sulfides, the resistance values of the rheostat 1a are raised throughout the whole range relative to the early-stage values, and variations in the resistance values are widen.

With the focus being directed to the resistance values of the rheostat 1a under full-tank conditions (in the non-linear range), it is shown that the resistance value increases with variations thereof widen, but become smaller than that at the end A of the linear range of the early-stage values. In other words, the fuel tank level sensor 1 according to the present invention is configured to discontinuously lower the resistance values under full-tank conditions, and can thereby allow the fuel gauge 6 to provide appropriate readouts (full-tank indication) under full-tank conditions even if sulfides are deposited and the resistance value increases.

Figure 4:
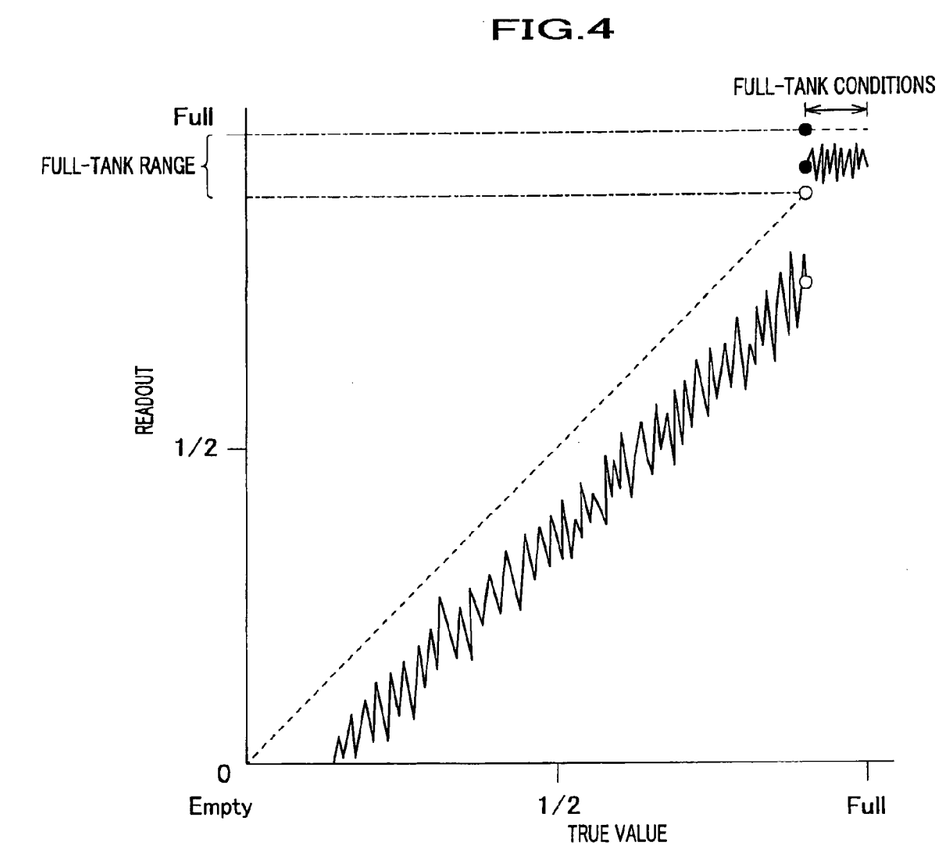
FIG. 4 shows a relationship between readouts of a fuel gauge, and true values.

FIG. 4 is a graph showing a relationship between the remaining amounts of fuel indicated by the fuel gauge 6 (readouts) and the actual remaining amounts of the fuel (true values), before and after sulfides are deposited; the axis of ordinates represents the readouts of the fuel gauge 6, and the axis of abscissas represents the true values indicating the amounts of fuel actually remaining in the fuel tank 2. A broken line is a graph showing a relationship between the readouts given before sulfides are deposited and the true values; it is shown that the true values are identical with the readouts.

A solid line is a graph showing a relationship between the readouts given after sulfides are deposited and the true values; it is shown that the readouts are smaller than the true values except under full-tank conditions while the readouts and the true values becomes identical with each other under full-tank conditions for the reasons as described above. To be more specific, hereupon, the fuel gauge 6 gives a readout falling within a full-tank indication range that may be recognized as a fill-up by a person who sees the indication of the fuel gauge 6.

Thus, the fuel tank level sensor 1 according to the present invention can provide the fuel gauge 6 with an appropriate readout indicating a fill-up under full-tank conditions even if sulfides are deposited and the resistance value increases.

In the present invention, the predetermined value (threshold) Rth should preferably be set so that the resistance value under full-tank conditions (in the non-linear range) does not exceed the value at the end A of the linear range, even if sulfides are deposited on the rheostat 1a or other places, and the resistance value increases with variations thereof widen.

Next, a detailed description will be given of the apparatus 3 for determining a remaining amount of fuel according to the present invention.

Figure 5:
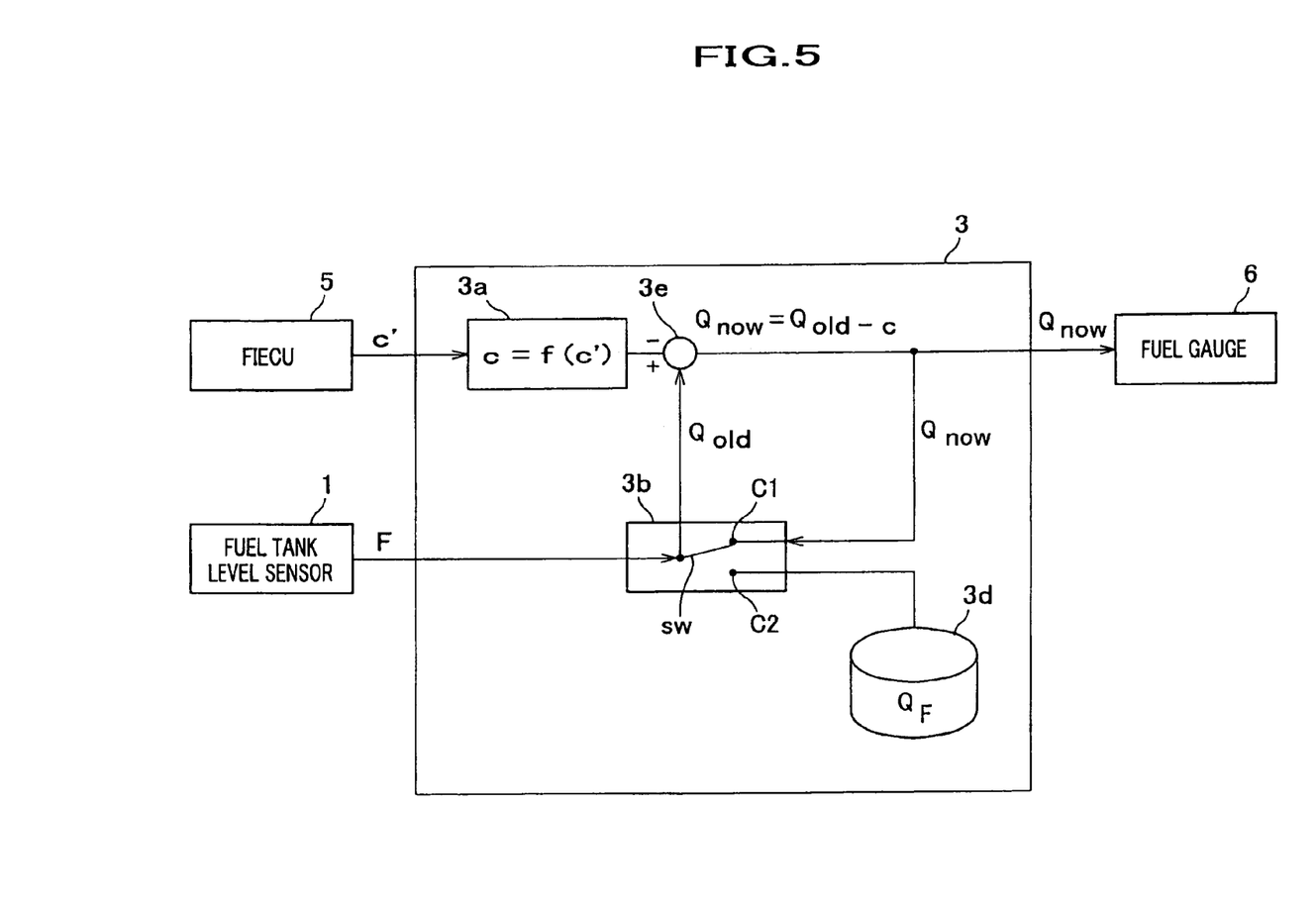
FIG. 5 is a functional block diagram of a first embodiment of the apparatus for determining a remaining amount of fuel according to the present invention.

A first embodiment of the apparatus 3 for determining a remaining amount of fuel will be described with reference to the functional block diagram shown in FIG. 5.

As will be discussed later in detail, the first embodiment of the apparatus 3 for determining a remaining amount of fuel is triggered by detection of a fill-up state of the fuel tank 2 (as in FIG. 1) using the fuel tank level sensor 1 to perform subtraction of a fuel consumption c from a full-tank capacity $Q_F$ to estimate a remaining amount of fuel $Q_{now}$.

The apparatus 3 for determining a remaining amount of fuel according to the first embodiment of the present invention includes a fuel consumption calculator 3a that receives fuel consumption information c' from the FIECU 5 to work out a fuel consumption c, a selector 3b that receives fill-up information from the fuel tank level sensor 1 according to the present invention, a storage 3d that retains a full-tank capacity $Q_F$ of the fuel tank 2, a subtracter 3e that works out a current amount of fuel $Q_{now}$ remaining in the fuel tank 2 from the fill-up information F, the full-tank capacity $Q_F$, and the fuel consumption c. The remaining amount of fuel $Q_{now}$ is outputted to the fuel gauge 6 and is given as a readout. Each element is implemented in the form of software, of which each module performs individual operations.

Next, a description will be given of an operation of the apparatus 3 for determining a remaining amount of fuel according to the first embodiment of the present invention.

The fill-up information F outputted from the fuel tank level sensor 1 is a flag having one of two values of 0 and 1; for example, if the remaining amount of fuel is equivalent to the value under full-tank conditions, F=1 is outputted, while otherwise, F=0 is outputted.

The fuel consumption calculator 3a receives as fuel consumption information c' an injection instruction value that the FIECU 5 outputs to an injector (not shown) of the fuel-injected engine (not shown), and calculates a quantity of fuel injection (fuel consumption c) per specific unit time (e.g., per minute).

The selector 3b performs operations different in each value of the fill-up information F. If F=1 (under a full-tank condition), the selector 3b performs an operation ($Q_{old}=Q_F$) for setting the full-tank capacity $Q_F$ to an operation parameter $Q_{old}$. On the other hand, if F=0 (not under a full-tank condition), the selector 3b performs an operation ($Q_{old}=Q_{now}$) for setting the current amount of fuel $Q_{now}$ remaining in the fuel tank 2 to an operation parameter $Q_{old}$.

Selection of operations in the selector 3b ($Q_{old}=Q_F$ or $Q_{old}=Q_{now}$) is achieved using a switch SW that changes a point of contact between contacts C1 and C2 in accordance with the values of the fill-up information F. More specifically, if the fill-up information F is zero, the switch SW establishes contact with the contact C1 to perform the operation $Q_{old}=Q_{now}$. On the other hand, if the fill-up information F is 1, the switch SW temporarily changes the point of contact to the contact C2, to perform the operation $Q_{old}=Q_F$. Hereupon, once the operation $Q_{old}=Q_F$ finishes, the switch SW immediately changes the point of contact back, and is kept in contact with the contact C1.

The subtracter 3e performs an operation $Q_{now}=Q_{old}-c$ to obtain a current amount of fuel $Q_{now}$ remaining in the fuel tank 2, from the fuel consumption c, which the fuel consumption calculator 3a has calculated from the fuel consumption information c', and $Q_{old}$ inputted from the selector 3b. Thus-obtained $Q_{now}$ is outputted to the fuel gauge 6 in which to be indicated as a readout, and outputted back again to the selector 3b so as to recalculate $Q_{now}$ that varies at every moment with consumption of fuel. Assuming for example that the fuel consumption calculator 3a calculates the fuel consumption c every one minute, the subtracter 3e also works out $Q_{now}=Q_{old}-c$ every one minute.

Figure 6:
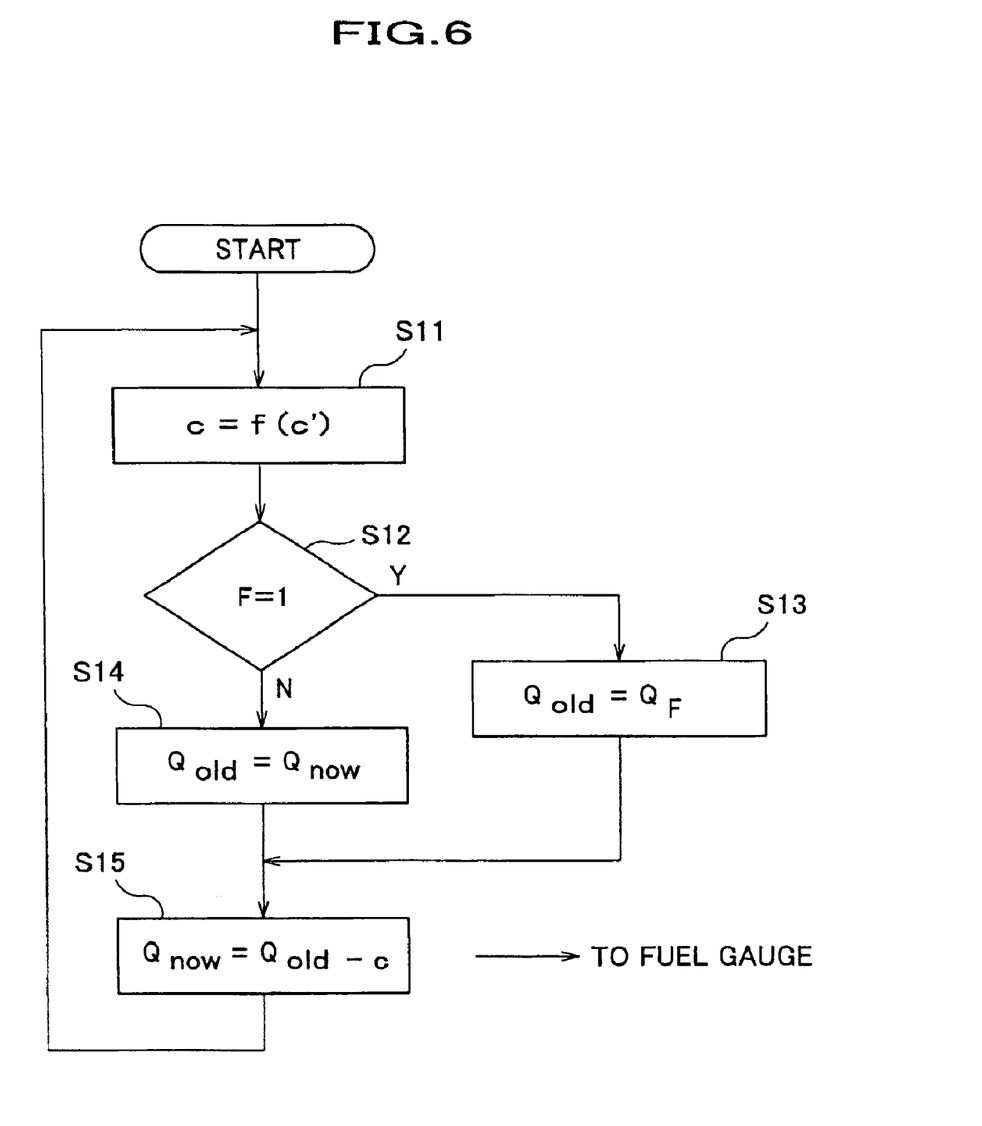
FIG. 6 is a flowchart of a control process carried out in the first embodiment of the apparatus for determining a remaining amount of fuel according to the present invention.

Next a description will be given of a control process of the apparatus 3 for determining a remaining amount of fuel according to the first embodiment of the present invention with reference to the flowchart shown in FIG. 6.

In step S11, the fuel consumption c for each predetermined period of time (one minute in this instance) is worked out from the fuel consumption information c'.

Denoted by S12 is a step where a conditional operation based upon a value of the fill-up information F is performed in the selector 3b. If F=1 (branch Y), the switch SW is brought into contact with the contact C2 in the selector 3b, to perform the operation $Q_{old}=Q_F$ (S13). Otherwise, i.e., if F=0 (branch N), the switch SW is brought into contact with the contact C1 in the selector 3b, to perform the operation $Q_{old}=Q_{now}$ (S14).

Next, in step S15, the operation $Q_{now}=Q_{old}-c$ is performed in the subtracter 3e, to work out the current amount of fuel $Q_{now}$ remaining in the fuel tank 2, which is outputted to the fuel gauge 6. Thereafter, the process returns to step S11, and loops the steps S11 through S15 for each period of one minute.

As described above, the apparatus 3 for determining a remaining amount of fuel according to the present invention estimates the remaining amount of fuel $Q_{now}$ without using resistance values of the rheostat 1a (as in FIG. 1) except under full-tank conditions where the fuel tank level sensor 1 can achieve accurate detection even upon deposition of sulfides, and can thus determine the remaining amount of fuel $Q_{now}$ accurately irrespective of whether sulfides are deposited on the rheostat 1a or not.

Figure 7:
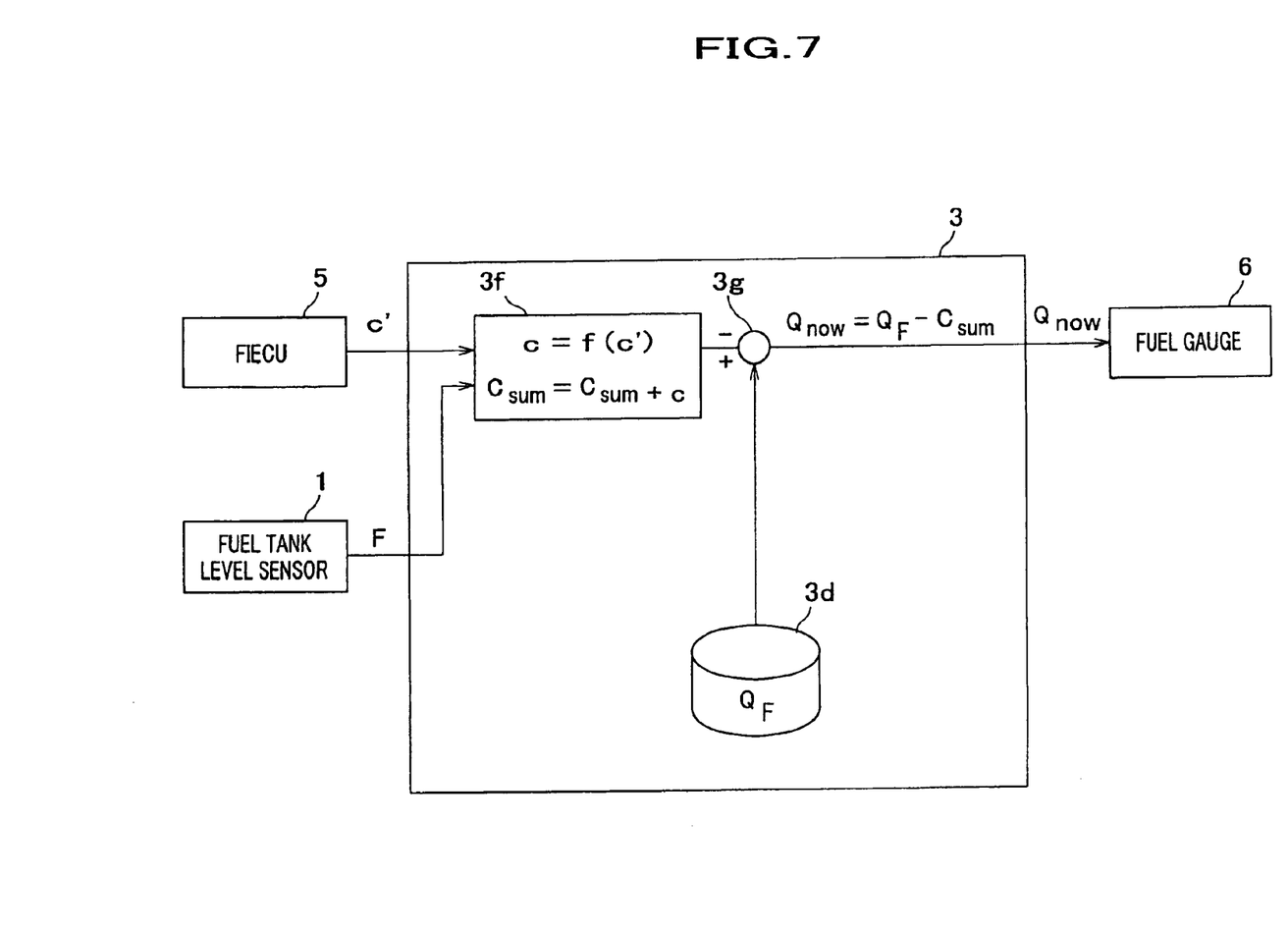
FIG. 7 is a functional block diagram of a second embodiment of the apparatus for determining a remaining amount of fuel according to the present invention.

Next, a second embodiment of the apparatus 3 for determining a remaining amount of fuel will be described with reference to the functional block diagram shown in FIG. 7. In FIG. 7, those elements corresponding to the components of FIG. 5 are identified by the same reference numerals, and a duplicate description thereof will be omitted.

The apparatus 3 for determining a remaining amount of fuel according to the second embodiment of the present invention includes a fuel consumption totalizer 3f that receives fuel consumption information c' from the FIECU 5 and fill-up information F from the fuel tank level sensor 1 respectively, a storage 3d that stores a full-tank capacity $Q_F$ of the fuel tank 2, and a subtracter 3g that works out a current amount of fuel $Q_{now}$ remaining in the fuel tank 2 from a totalized fuel consumption $C_{sum}$ obtained from the fuel consumption totalizer 3f and the full-tank capacity $Q_F$. The remaining amount of fuel $Q_{now}$ is outputted to the fuel gauge 6 and is given as a readout.

Next, a description will be given of an operation of the apparatus 3 for determining a remaining amount of fuel according to the second embodiment of the present invention.

In the fuel consumption totalizer 3f, if the fill-up information becomes 1, totalization of the fuel consumption c is initiated; the totalized fuel consumption $C_{sum}$ is worked out by performing totalizing operations at predetermined intervals, and is outputted to the subtracter 3g. To be more specific, the fuel consumption totalizer 3f is triggered by a flag set at 1 of the fill-up information F to perform the operation $C_{sum}=C_{sum}+c$, so as to acquire the totalized fuel consumption $C_{sum}$, the total amount of fuel consumed from the full-tank condition. It is assumed that the fuel consumption c is worked out every one minute, as in the first embodiment.

In the subtracter 3g, the totalized fuel consumption $C_{sum}$ is subtracted from the full-tank capacity $Q_F$, to work out a current amount of fuel $Q_{now}$ remaining in the fuel tank 2, which is outputted to the fuel gauge 6.

Figure 8:
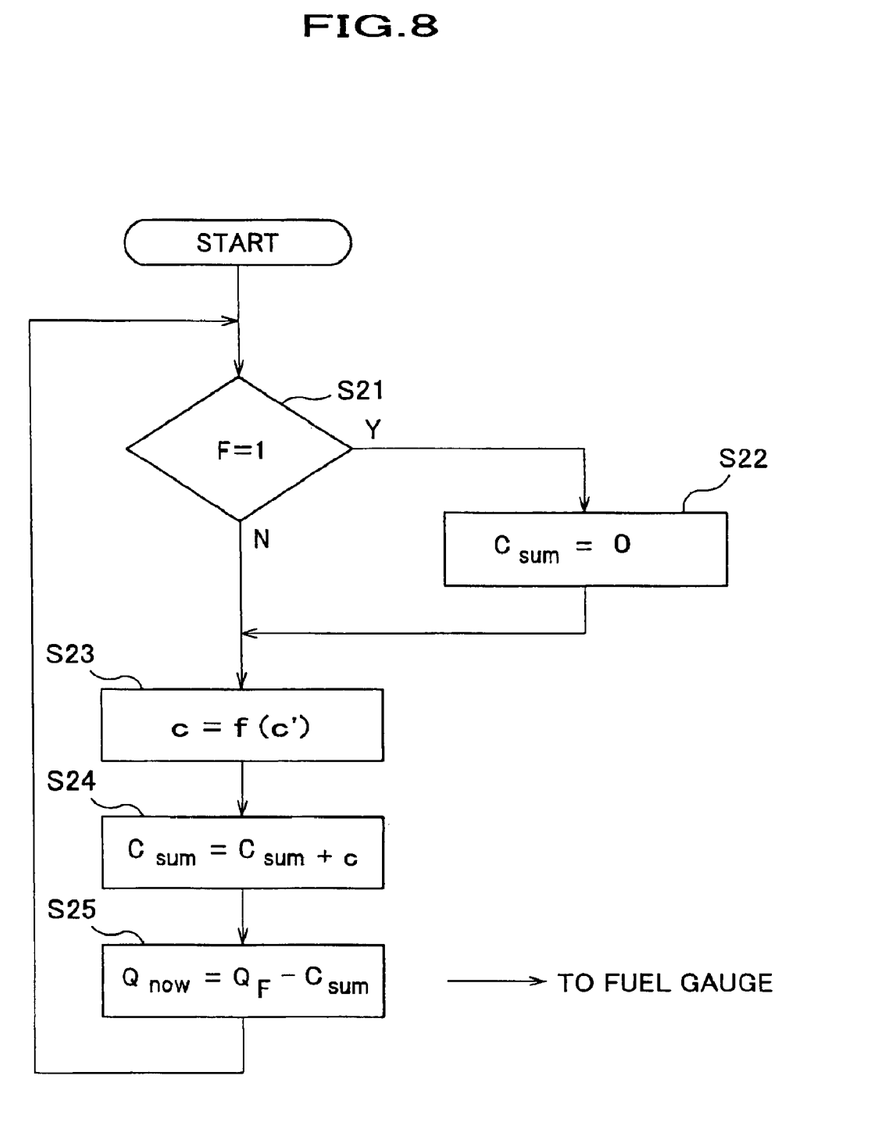
FIG. 8 is a flowchart of a control process carried out in the second embodiment of the apparatus for determining a remaining amount of fuel according to the present invention.

Next, a description will be given of a control flow of the apparatus 3 for determining a remaining amount of fuel according to the second embodiment of the present invention with reference to the flowchart shown in FIG. 8.

Denoted by S21 is a step where a conditional operation is performed in the fuel consumption totalizer 3f. If F=1 (branch Y), the operation $C_{sum}=0$ is performed in step S22 to initialize the $C_{sum}$, and the process goes to step S23. If F=0 (branch N), the fuel consumption c for each predetermined period of time (one minute in this instance) is worked out from the fuel consumption information c' in step S23. Subsequently, in step S24, the operation $C_{sum}=C_{sum}+c$ is performed to work out a totalized value of $C_{sum}$.

Next, in step S25, the operation $Q_{now}=Q_F-C_{sum}$ is performed to work out a current amount of fuel $Q_{now}$ remaining in the fuel tank 2, which is outputted to the fuel gauge 6. Thereafter, the process goes back to step S21, and loops the steps S21 through S25, for each period of one minute, for example.

As described above, the apparatus 3 for determining a remaining amount of fuel according to the present invention estimates the remaining amount of fuel $Q_{now}$ without using resistance values of the rheostat 1a (as in FIG. 1) except under full-tank conditions where the fuel tank level sensor 1 can achieve accurate detection even upon deposition of sulfides, and can thus determine the remaining amount of fuel $Q_{now}$ accurately irrespective of whether sulfides are deposited on the rheostat 1a or not.

An accurate fuel consumption c can be determined from the injection instruction value that the fuel-injected engine outputs to the injector; however, parameters related to the instruction value as well as the injection instruction value may also be used to work out the remaining amount of fuel $Q_{now}$.

Although the deposition of sulfides on the fuel tank level sensor 1 which would make the readouts of the fuel gauge 6 fluctuate (i.e., causing the readouts to rise and fall), could possibly give a driver a vague sense of injustice on some occasions, the remaining amount of fuel $Q_{now}$ acquired from the fuel consumption c as described above provides constantly decreasing readouts of the fuel gauge 6, serving to prevent the driver from feeling such a sense of injustice.

INDUSTRIAL APPLICABILITY

The fuel tank level sensor according to the present invention provides a non-linear range of resistance values of the rheostat in which the resistance value discontinuously varies and exhibits a unique value when the fuel tank is substantially filled up, and thus even if sulfides are deposited on the fuel tank level sensor and the resistance values of the rheostat are raised, the fuel tank level sensor can accurately detect the full-tank conditions of the fuel tank.

The apparatus for determining a remaining amount of fuel according to the present invention estimates the remaining amount of fuel without using the resistance values of the rheostat except under full-tank conditions where the fuel tank level sensor can achieve accurate detection even upon deposition of sulfides, and can thus estimate the remaining amount of fuel accurately irrespective of whether sulfides are deposited on the rheostat or not.

What is claimed is:

1. A fuel tank level sensor for measuring a remaining amount of fuel in accordance with a resistance value which is varied by moving a rheostat utilizing a float that vertically moves according to increase and decrease of the fuel in a fuel tank, change in resistance value of the rheostat comprising:

a linear range in which the resistance value linearly varies with the increase and decrease of the fuel volume; and a non-linear range in which the resistance value discontinuously varies with the increase and decrease of the fuel volume under full-tank conditions where the fuel tank is substantially filled up with the fuel.

2. An apparatus for determining a remaining amount of fuel, which apparatus determines the amount of fuel remaining in a fuel tank in accordance with fuel consumption information of a fuel-injected engine, fill-up information detected by the fuel tank level sensor according to claim 1, and a full-tank capacity of the fuel tank, wherein the apparatus works out the amount of fuel remaining in the fuel tank by subtracting from the full-tank capacity a fuel consumption indicated by the fuel consumption information, the fuel consumption having a value totalized after the fill-up information indicates that the fuel tank is filled up.

3. A device for determining a remaining amount of fuel in a fuel tank, the device comprising:
   a fuel tank level sensor measuring a remaining amount of fuel in accordance with a resistance value which is varied by moving a rheostat utilizing a float that vertically moves according to increase and decrease of the fuel in a fuel tank, wherein the change in resistance value of the rheostat comprises:
   a linear range in which the resistance value linearly varies with the increase and decrease of the fuel; and
   a non-linear range in which the resistance value discontinuously varies under full-tank conditions where the fuel tank is substantially filled up with the fuel;
   a fuel injection electronic control unit;
   a fuel consumption calculator that receives fuel consumption information from the fuel injection electronic control unit;
   a selector that receives fill-up information from the tank level sensor;
   a subtractor that determines the current amount of fuel remaining in the fuel tank base on fill-up information from the tank level sensor, fuel consumption information from the fuel injection electronic control unit, and the capacity of the fuel tank.

4. The device of claim 3, wherein the subtractor calculates fuel consumed since the subtractor received a signal from the tank level sensor indicating that the tank was full and calculates the remaining fuel in the tank by subtracting the fuel consumed from the capacity of the fuel tank.

5. A fuel tank level sensor for measuring a remaining amount of fuel in accordance with a resistance value which is varied by moving a rheostat utilizing a float that vertically moves according to increase and decrease of the fuel in a fuel tank, change in resistance value of the rheostat comprising:
   a linear range in which the resistance value linearly varies with the increase and decrease of the fuel; and
   a non-linear range in which the resistance value discontinuously varies under full-tank conditions where the fuel tank is substantially filled up with the fuel, wherein in the non-linear range the resistance value discontinuously varies by a predetermined value such that accurate readouts are provided under full-tank conditions.

6. The fuel tank level sensor according to claim 5, wherein the non-linear range is located at the end of the linear range which corresponds to a position at which the fuel tank is substantially full.

7. A fuel tank level sensor for measuring a remaining amount of fuel in accordance with a resistance value which is varied by moving a rheostat utilizing a float that vertically moves according to increase and decrease of the fuel in a fuel tank, change in resistance value of the rheostat comprising:
   a linear range in which the resistance value linearly varies with the increase and decrease of the fuel; and
   a non-linear range in which the resistance value discontinuously varies under full-tank conditions where the fuel tank is substantially filled up with the fuel, wherein a full-tank indication is provided under full-tank conditions irrespective of deposition of sulfides on the rheostat.

* * * * *